US012568945B1

(12) United States Patent (10) Patent No.: US 12,568,945 B1
Kowalski et al. (45) Date of Patent: Mar. 10, 2026

(54) FISHING ROD-SPIKE ASSEMBLY

(71) Applicant: Active Outdoors LLC, Glen Lyon, PA (US)

(72) Inventors: James Kowalski, Nanticoke, PA (US); David D. McClanahan, Harleysville, PA (US)

(73) Assignee: ACTIVE OUTDOORS LLC, Glen Lyon, PA (US)

( * ) Notice: Subject to any disclaimer, the term of this patent is extended or adjusted under 35 U.S.C. 154(b) by 0 days.

(21) Appl. No.: 19/224,989

(22) Filed: Jun. 2, 2025

(51) Int. Cl.
*A01K 97/10* (2006.01)

(52) U.S. Cl.
CPC .................................... *A01K 97/10* (2013.01)

(58) Field of Classification Search
CPC ........ A01K 97/10; A01K 97/04; A01K 97/06; E04H 12/2223; A45B 23/00; A45B 2023/0012; A45B 2200/1009
See application file for complete search history.

(56) References Cited

U.S. PATENT DOCUMENTS

| | | | | |
|---|---|---|---|---|
| 2,204,692 A | * | 6/1940 | Parisio | .................... A01K 97/10 248/530 |
| 2,580,396 A | * | 1/1952 | Bluth | ...................... F16B 21/16 24/DIG. 42 |
| 2,828,525 A | * | 4/1958 | Gail | ........................ F16L 33/04 24/279 |
| 3,021,101 A | * | 2/1962 | Gliebe | .................... A01K 97/10 24/3.9 |

| | | | | |
|---|---|---|---|---|
| 3,074,674 A | | 1/1963 | Hill | |
| 3,182,937 A | * | 5/1965 | Manning | ................ A01K 97/10 248/514 |
| 3,318,560 A | * | 5/1967 | Garrette, Jr. | .......... E04H 12/182 52/165 |
| 3,344,551 A | * | 10/1967 | Chestnut | ................ A01K 97/10 248/156 |

(Continued)

FOREIGN PATENT DOCUMENTS

| | | | |
|---|---|---|---|
| AU | 2018282462 B2 | 1/2019 | |
| AU | 2022231755 A1 | * 4/2023 | ............. A01K 97/10 |

(Continued)

OTHER PUBLICATIONS

KR-20110004112-U Translation (Year: 2011).*

*Primary Examiner* — Katelyn T Truong

(74) *Attorney, Agent, or Firm* — Invention To Patent Services; Alex Hobson

(57) ABSTRACT

A fishing rod-spike assembly includes a rod-spike assembly incorporating a sand spike that is coupled to a rod sleeve and is configured to be stowed within the rod sleeve and slide out from the rod sleeve for insertion into the sand, and includes an insertion step that is pivotably connected with the spike and configured to fold up along the length of the spike to also be stowed within the rod sleeve. Also, a fishing rod-spike assembly may include a cutting board attachment that may have bait holder coupled thereto, a mobile phone holder and/or a beverage holder. These holders may be detachably attachable to the rod sleeve. The rod-spike assembly is stowable within the rod sleeve and is slidably engaged within the rod sleeve from an engaged stowed configuration to an extended configuration from the rod sleeve for insertion into sand.

15 Claims, 8 Drawing Sheets

(56)            References Cited

U.S. PATENT DOCUMENTS

| | | | | |
|---|---|---|---|---|
| 3,602,471 | A * | 8/1971 | Reed, III | B64D 1/02 |
| | | | | 248/156 |
| 3,831,891 | A | 8/1974 | Jester | |
| 4,061,301 | A * | 12/1977 | Catend, Jr. | A45F 3/44 |
| | | | | 248/156 |
| 4,063,701 | A * | 12/1977 | Wray | A47C 7/624 |
| | | | | 297/188.2 |
| 4,650,146 | A | 3/1987 | Duke | |
| 5,349,775 | A | 9/1994 | Mondares | |
| 5,609,436 | A * | 3/1997 | Jou | F16B 7/0493 |
| | | | | 403/DIG. 9 |
| 5,639,057 | A * | 6/1997 | Yeomans | E06C 7/46 |
| | | | | 248/156 |
| 5,749,386 | A * | 5/1998 | Samuel, Jr. | A45B 3/00 |
| | | | | 248/530 |
| 5,797,697 | A * | 8/1998 | Keller | F16B 7/0493 |
| | | | | 403/392 |
| 5,996,511 | A * | 12/1999 | Swoger | A47B 57/26 |
| | | | | 108/151 |
| 6,123,482 | A * | 9/2000 | Keller | F16B 7/0493 |
| | | | | 403/384 |
| 6,338,465 | B1 | 1/2002 | Stoner | |
| 6,490,823 | B1 | 12/2002 | Ibarra | |
| 6,547,203 | B1 * | 4/2003 | Willard | E04H 12/2223 |
| | | | | 248/530 |
| 6,651,374 | B1 * | 11/2003 | Ridlen | A01K 97/10 |
| | | | | 248/514 |
| 6,938,865 | B1 * | 9/2005 | Day | B62J 11/00 |
| | | | | 248/316.1 |

| | | | | |
|---|---|---|---|---|
| 7,231,694 | B2 * | 6/2007 | Ignaczak | F01N 13/1805 |
| | | | | 248/74.1 |
| 7,401,753 | B2 * | 7/2008 | Bozmoski | F16L 39/00 |
| | | | | 248/316.1 |
| 8,136,458 | B1 * | 3/2012 | Cass | D06F 53/005 |
| | | | | 108/42 |
| 8,136,771 | B2 * | 3/2012 | Cazalet | F16L 3/10 |
| | | | | 248/65 |
| 9,155,292 | B1 | 10/2015 | Tweedie | |
| 9,629,427 | B1 * | 4/2017 | Alm | A45B 25/00 |
| 11,019,912 | B2 * | 6/2021 | Saunders | A45C 3/10 |
| 11,178,959 | B1 | 11/2021 | Stockton et al. | |
| 11,839,203 | B2 | 12/2023 | Barney | |
| 12,219,946 | B2 | 2/2025 | Kremper | |
| 2006/0048441 | A1 | 3/2006 | Sharff | |
| 2009/0139132 | A1 * | 6/2009 | Knight | A01K 97/04 |
| | | | | 43/54.1 |
| 2015/0208634 | A1 * | 7/2015 | Box | A47B 88/00 |
| | | | | 108/25 |
| 2017/0223439 | A1 * | 8/2017 | Cross | F16M 13/022 |
| 2017/0294802 | A1 * | 10/2017 | Volin | A45B 3/00 |
| 2019/0343105 | A1 | 11/2019 | Best | |
| 2020/0355205 | A1 * | 11/2020 | Ma | F16B 35/041 |
| 2021/0001454 | A1 * | 1/2021 | Hefti | B25B 5/061 |
| 2021/0076653 | A1 | 3/2021 | Leigh | |
| 2024/0381862 | A1 | 11/2024 | Wachter | |

FOREIGN PATENT DOCUMENTS

| | | | | | |
|---|---|---|---|---|---|
| KR | 20110004112 | U | * | 4/2011 | A01K 97/06 |
| WO | WO-2008037023 | A1 | * | 4/2008 | A01K 97/04 |

* cited by examiner

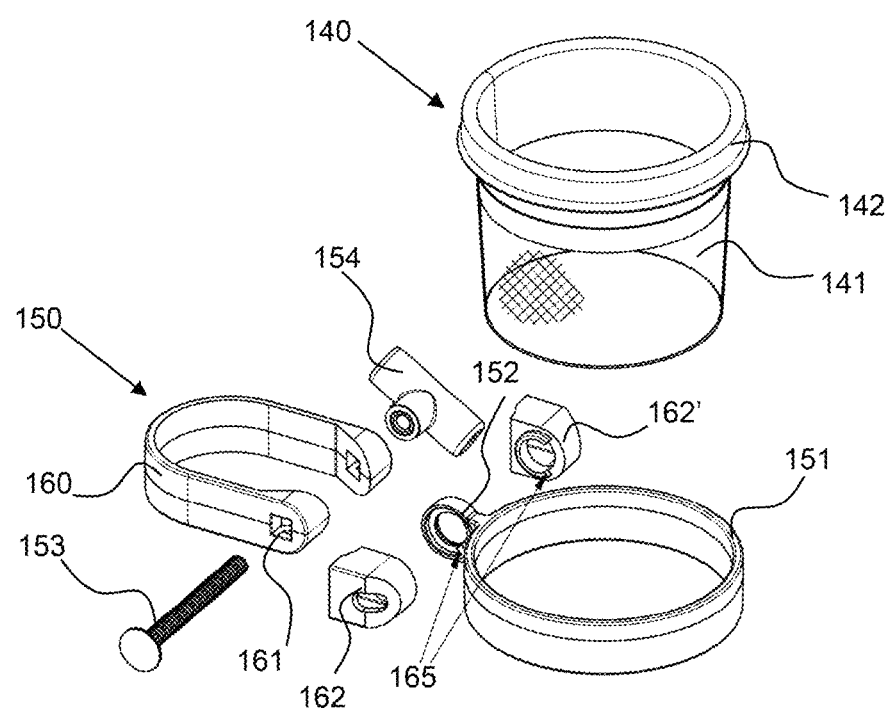
FIG. 13
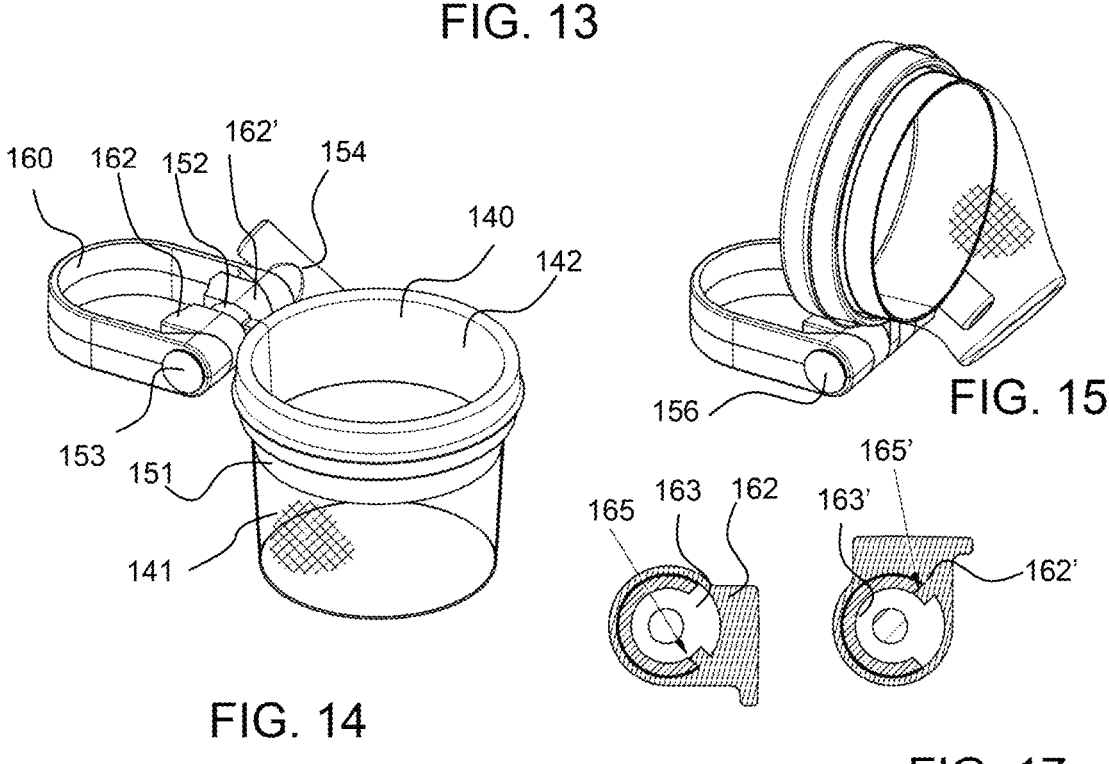
FIG. 14
FIG. 15
FIG. 16     FIG. 17

FISHING ROD-SPIKE ASSEMBLY

BACKGROUND OF THE INVENTION

Field of the Invention

The invention relates a fishing rod-spike assembly that includes a sand spike that is coupled to a rod sleeve and is configured to be stowed within the rod sleeve and slide out from the rod sleeve for insertion into the sand, and includes an insertion step that is pivotably connected with the spike and configured to fold up along the length of the spike to also be stowed within the rod sleeve.

Background

Surf fishing is a popular sport and surf fishing rods are usually retained in a sand-spike rod holder, typically a tube having a sharp end that can be inserted into the sand. These sand-spike rod holders are difficult to insert into the sand to a depth to secure it effectively, especially when fishing for large game fish that can put a lot of torque on the fishing rod and therefore the sand-spike rod holder. Also, fishermen often store items, beverages, cell phones, bait, knives and/or pliers, on a cooler that they bring with them, but these items easily fall of the cooler into the sand and/or impede entry into the cooler.

SUMMARY OF THE INVENTION

A fishing rod-spike assembly includes a rod-spike assembly incorporating a sand spike that is coupled to a rod sleeve and is configured to be stowed within the rod sleeve and slide out from the rod sleeve for insertion into the sand, and includes an insertion step that is pivotably connected with the spike and configured to fold up along the length of the spike to also be stowed within the rod sleeve. Also, a fishing rod-spike assembly may include a cutting board attachment that may have bait holder coupled thereto, a mobile phone holder and/or a beverage holder. These holders may be detachably attachable to the rod sleeve.

An exemplary rod-spike assembly of a surf fishing rod holder system is configured with the spike that is stowable within the rod sleeve. The spike is slidably engaged within the rod sleeve of the rod-spike assembly to substantially stow, such as at least 90% of the length of the spike, or fully stow within the rod sleeve. The rod sleeve forms a sleeve tube for retaining the spike therein when not in use. The spike slides into the rod sleeve along with the insertion step, that has a step pivot to pivot the insertion step along the spike, such as into a step recess in the spike configured to receive the insertion step. The rod sleeve extends a rod sleeve length from the insertion end, configured for insertion of a fishing rod, to the sleeve-spike end, the end from which the spike actuates out from the sleeve tube.

The rod sleeve length may be about 0.5 m or more, about 0.65 m or more, about 0.8 m or more or even about 1 m or more and any range between and including the length values provided. The spike extends a spike length along a length axis from spike coupled end to spike end that may be about the same or less than the length of the rod sleeve and may be about 0.4 m or more, about 0.5 m or more, about 0.6 m or more, about 0.8 m or more, or about 1.0 m or less and any range between and including the values provided. The length of the extended portion of the spike and the rod sleeve, or from the spike end to the insertion end of the of the rod sleeve may be about 0.8 or more, about 0.9 m or more, about 1.0 m or more, about 1.2 m or more, about 1.4 m or more, about 1.5 m or less, and any range between and including the length values provided.

The spike has a spike coupler portion on the spike coupled end that includes the spike retainer that retains the spike in a stowed configuration and in an extended configuration. A spike retainer, such as a spike-ball that is coupled to a spike-retainer spring, that forces the spike retainer outward from the spike. This spike-ball is aligned with the sleeve-spike insert end retainer aperture and the sleeve-spike end retainer aperture of the rod sleeve and enables the spike to be retained in a stowed configuration with the spike-ball retained by the sleeve-spike end retainer aperture and then, upon releasing the spike-ball by pressing inward on the spike-ball, slide down to the sleeve-spike end retainer aperture to configured the spike in an extended configuration. The force of the spike-retainer spring can be overcome by pressing inward on the spike retainer through the respective apertures in the rod sleeve. The spike end collar of the rod sleeve has a spike end collar aperture that aligns with the sleeve-spike end retainer aperture to receive the spike retainer therethrough to retain the spike in an extended configuration with the spike ball extending therethrough and the rod sleeve also has an sleeve-spike insert-end retainer aperture to receive the spike retainer therein to secure the spike in a stowed configuration.

The spike coupler portion may also include spike guides, such as indentations or protrusions that conform with a respective protrusion or indentation in the rod sleeve to guide the spike along the interior of the rod sleeve without rotation. A preferred spike guide is a spike indentation to enable the wall of the spike sleeve to be thin to keep the rod-spike assembly lightweight. Spike indentations may be configured to couple with the sleeve tube ribs to keep the spike aligned during movement within the sleeve tube.

The rod sleeve may have a rod sleeve tube rib(s) that correspond with a spike indentation(s) to prevent the spike from rotating as the spike is extended from the stowed position to an extended position to ensure that the spike retainer remains in alignment with the sleeve-spike insert-end retainer aperture in the stowed configuration and the sleeve-spike end retainer aperture when in an extended configuration. Note that the tube ribs and/or the spike indentations may extend between the sleeve-spike insert-end retainer aperture and the sleeve-spike end retainer aperture and the other may extend only a portion of the length between these two apertures, thereby reducing friction.

Also, a spike coupler portion may have spike coupler apertures extending through the spike coupler portion to enable water and sand to pass through the spike coupler portion and then along the spike extension and out from the rod-spike assembly. The spike extension may include spike ribs that form slots or grooves that allow water and sand to pass along the spike extension.

A rod-spike assembly may include an insertion step that is coupled to the spike and is configured to pivot about a step pivot from a stowed configuration with wherein the insertion step is pivoted up against the spike and into step recess of the spike extension to allow clearance for the spike to slide within the sleeve tube of the rod sleeve, to an insertion configuration with the insertion step pivoted out from the spike sleeve, such as orthogonal to the length axis of the spike. An insertion step has a length along a length axis from a step coupled end to a step extended end and may have a step pivot aperture that enables a pivotable connection to the spike via the pivot retainer, such as a step pivot retainer pin. The length of the insertion step may be about 6 cm or more, about 8 cm or more, about 10 cm or more, about 12 cm or more, about 15 cm or less, or from about 6 cm to about 12 cm and any other range between and including the insertion step lengths provided.

A rod-spike assembly may include a strap that is detachably attachable to the rod sleeve via the strap insert end coupler and the strap spike end coupler that are attachable to the respective insertion collar strap retainer and spike collar strap retainer. The insertion collar strap retainer and spike collar strap retainer may be configured on the respective insertion end collar and spike end collar.

A surf fishing rod holder system may include a cutting board, bait holder, beverage holder and/or a mobile device holder that are attached or detachably attachable to the rod sleeve. Each of these components of the surf fishing rod holder system may be detachably attachable to the rod sleeve via attachment rings that extend around the rod sleeve and can be tightened around the rod sleeve to prevent the component from sliding along the rod sleeve. The cutting board and bait holder assembly includes the cutting board attachment ring that extends around the rod sleeve and secures the cutting board to the rod sleeve and a bait enclosure ring that is coupled to the cutting board by the bait enclosure retainer assembly. The beverage holder is retained by the beverage holder ring that is coupled to the beverage holder sleeve ring that extends around the rod sleeve. Likewise, the mobile device is retained to the rod sleeve by the mobile device holder including a mobile device ring that extends around the rod sleeve.

A cutting board and bait holder assembly may include a cutting board that is pivotably coupled to the rod sleeve and a bait holder that is pivotably coupled to the cutting board. The cutting board attachment may include a cutting board attachment ring that is configured to extend around the rod sleeve and tighten around the rod sleeve via the cutting board attachment ring fastener that extends through the cutting board attachment ring sleeve aperture of the cutting board attachment ring sleeves the cutting board coupled end fastener aperture and the attachment ring wedge that pressed against the rod sleeve as the cutting board attachment ring fastener is tightened by the cutting board attachment ring fastener retainer. This produces a cutting board sleeve pivot with the rod sleeve to enable the cutting board to pivot with respect to the rod sleeve and the be tightened by the cutting board attachment ring fastener retainer to secure the cutting board in a pivoted position. The cutting board extends from the cutting board coupled end to the cutting board extended end.

The attachment ring wedge may have surfaces that are configured to slide along mating surface to force the attachment ring wedge against the rod sleeve as the cutting board attachment ring fastener is tightened through the cutting board attachment ring sleeve. The attachment ring wedge has wedge-sleeve surfaces that slide along the sleeve-wedge surfaces. Also, the wedge may have a wedge-rod surface that is curved to match the curvature of the rod sleeve to enable a secure retainment of the cutting board and bait holder assembly to the rod sleeve.

The bait holder may be coupled to the cutting board extended end by the bait enclosure retainer assembly including a bait enclosure ring that is secured to the cutting board by the bait enclosure fastener that extends through the cutting board extended end aperture the bait enclosure ring fastener aperture and is tightened by the bait enclosure fastener retainer. The bait holder has a bait enclosure flange that is configured to rest on the bait enclosure ring and the bait holder may be a rigid material or may be flexible, such as a netting material that is supple.

A beverage holder may be secured to the rod sleeve by a beverage holder retainer assembly that includes a beverage holder sleeve ring configured to extend around the rod sleeve and tighten thereto via the beverage holder fastener 153 that extends through the beverage holder sleeve ring aperture, through the beverage holder wedges and the beverage holder ring loop and is tightened by the beverage holder fastener retainer to form the beverage holder pivot. The beverage holder ring loop may be attached to the beverage holder ring and the beverage holder has a beverage holder flange configured around the top of the beverage holder receptacle The beverage holder may pivot up or pivot down with respect to the beverage holder sleeve ring.

The summary of the invention is provided as a general introduction to some of the embodiments of the invention and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

FIG. 13 shows an exploded view of the beverage holder and beverage holder retainer assembly.

FIG. 14 shows a perspective view of the beverage holder and beverage holder retainer assembly.

FIG. 15 shows a perspective view of the beverage holder and beverage holder retainer assembly with the beverage holder ring pivoted up toward the beverage holder sleeve ring about the beverage holder pivot.

FIG. 16 shows an end view of the beverage holder wedge having a wedge stop that prevents the beverage holder wedge from rotating when engaged with the beverage holder ring loop.

FIG. 17 shows an end view of the beverage holder wedge having a wedge stop that prevents the beverage holder wedge from rotating when engaged with the beverage holder ring loop.

Figures 1, 2, 3:
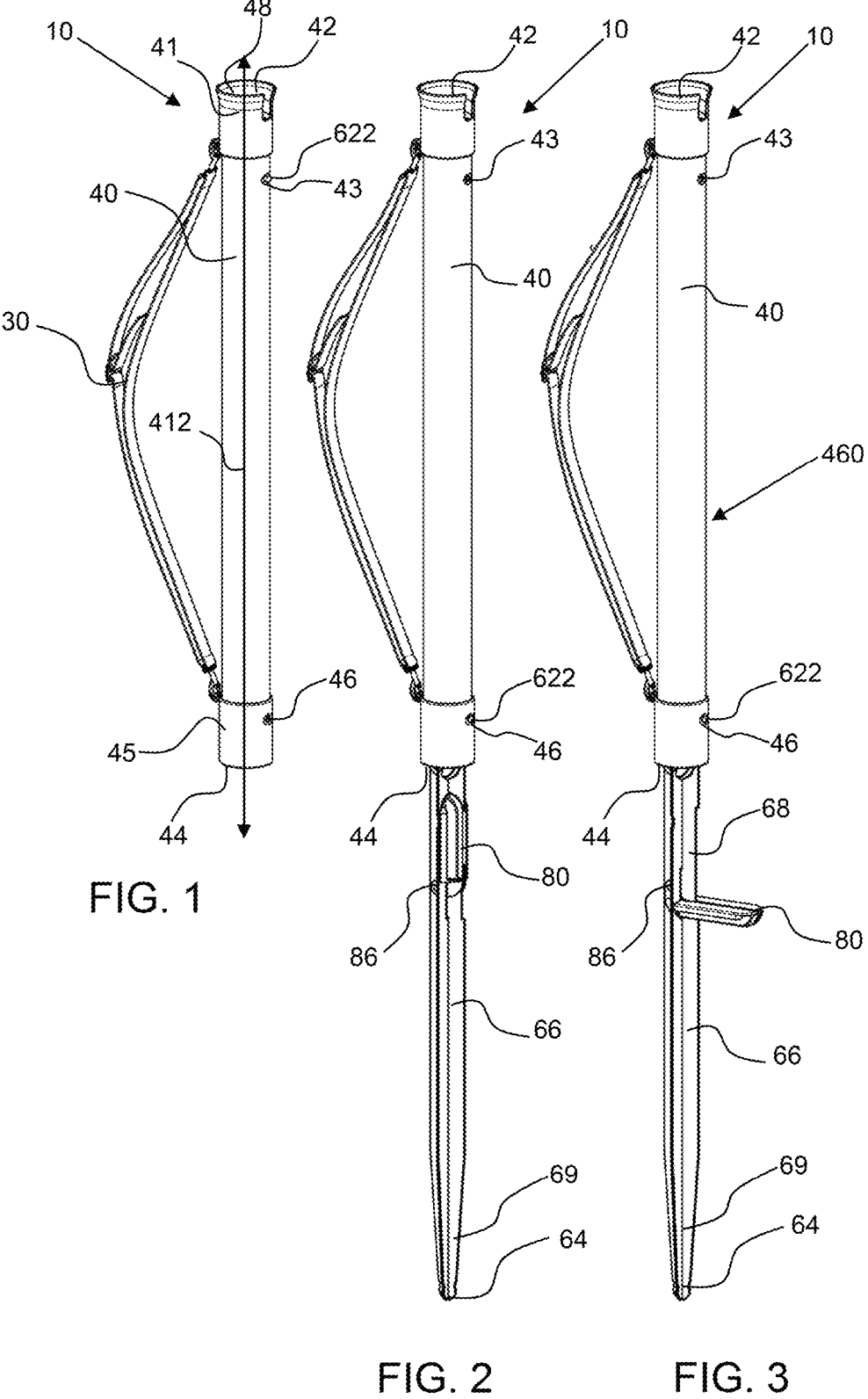
FIG. 1 shows a side view of a surf fishing rod holder system with the spike stowed within the rod sleeve.
FIG. 2 shows a side view of the surf fishing rod holder system shown in FIG. 1, with the spike extended out from the spike end of the rod sleeve.
FIG. 3 shows a side view of the surf fishing rod holder system shown in FIG. 2, with the insertion step pivoted down for inserting the surf fishing rod holder into the sand.

Corresponding reference characters indicate corresponding parts throughout the several views of the figures. The figures represent an illustration of some of the embodiments of the present invention and are not to be construed as limiting the scope of the invention in any manner. Some of the figures may not show all the features and components of the invention for ease of illustration, but it is to be understood that where possible, features and components from one figure may be included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Referring now to FIGS. 1 to 4, an exemplary rod-spike assembly 460 of a surf fishing rod holder system 10 is configured with the spike 60 stowed within the rod sleeve 40. The spike 60 is slidably engaged within the rod sleeve 40 of the rod-spike assembly 460. The rod sleeve 40 forms a sleeve tube 48 for retaining the spike 60 therein when not in use and the rod sleeve extends a length along a length axis 412. The spike slides into the rod sleeve along with the insertion step, that has a step pivot to pivot the insertion step along the spike such as into a step recess 68 in the spike configured to receive the insertion step. The rod sleeve extends a rod sleeve length from the insertion end 42, configured for insertion of a fishing rod, to the sleeve-spike end 44, the end from which the spike actuates out from the sleeve tube 48. The rod sleeve length may be about 0.5 m or more, about 0.65 m or more, about 0.8 m or more or even about 1 m or more and any range between and including the length values provided. The length of the spike may be about the same or less than the length of the rod sleeve and may be about 0.4 m or more, about 0.5 m or more, about 0.6 m or more, about 0.8 m or more, or about 1.0 m or less and any range between and including the values provided. The length of the extended portion of the spike and the rod sleeve, or from the spike end 64 to the insertion end 42 of the of the rod sleeve 40 may be about 0.8 or more, about 0.9 m or more, about 1.0 m or more, about 1.2 m or more, about 1.4 m or more, about 1.5 m or less, and any range between and including the length values provided.

Figure 4:
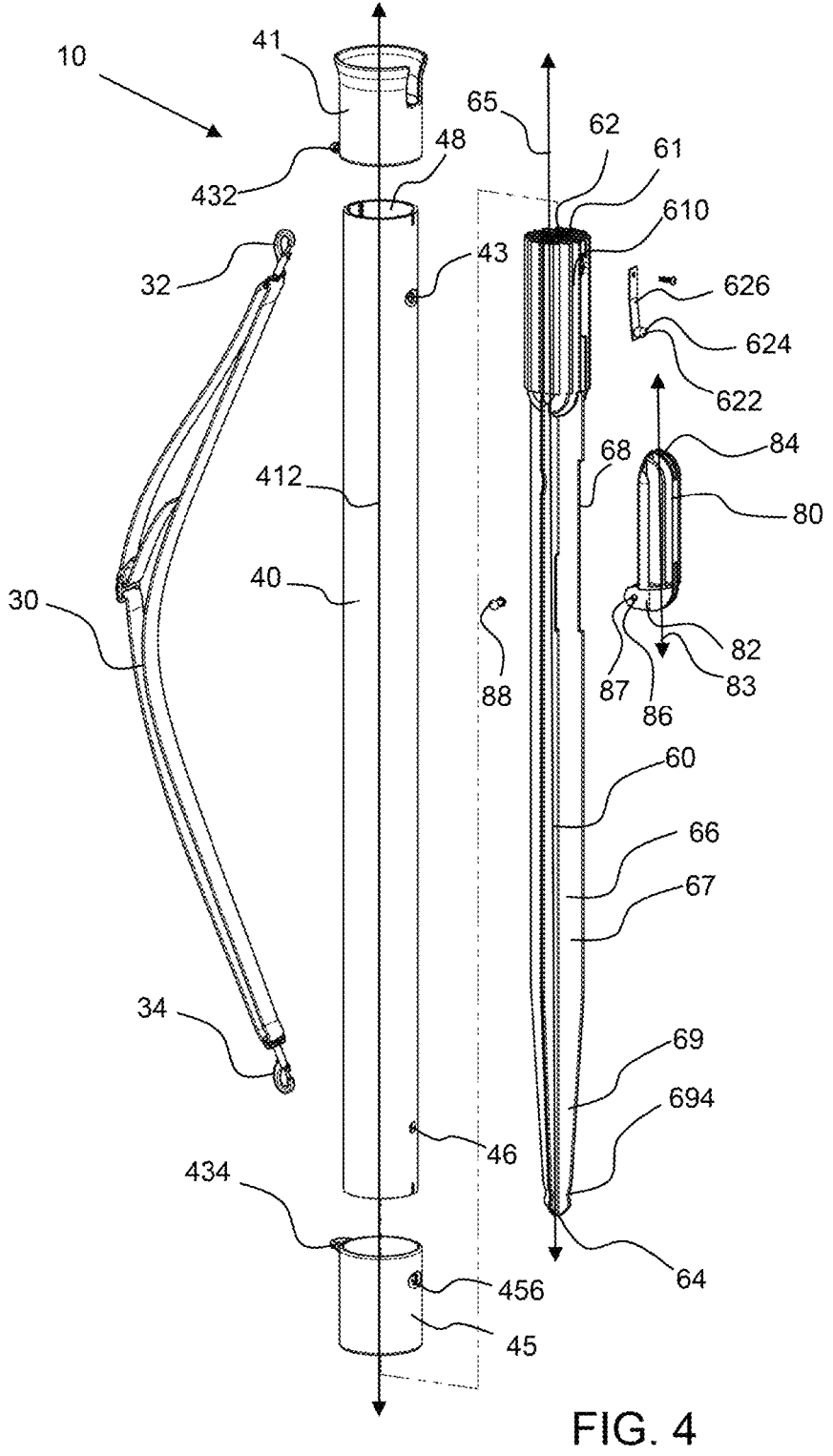
FIG. 4 shows an exploded side view of the surf fishing rod holder system shown in FIG. 1, with the spike configured outside of the rod sleeve.
Figure 12:
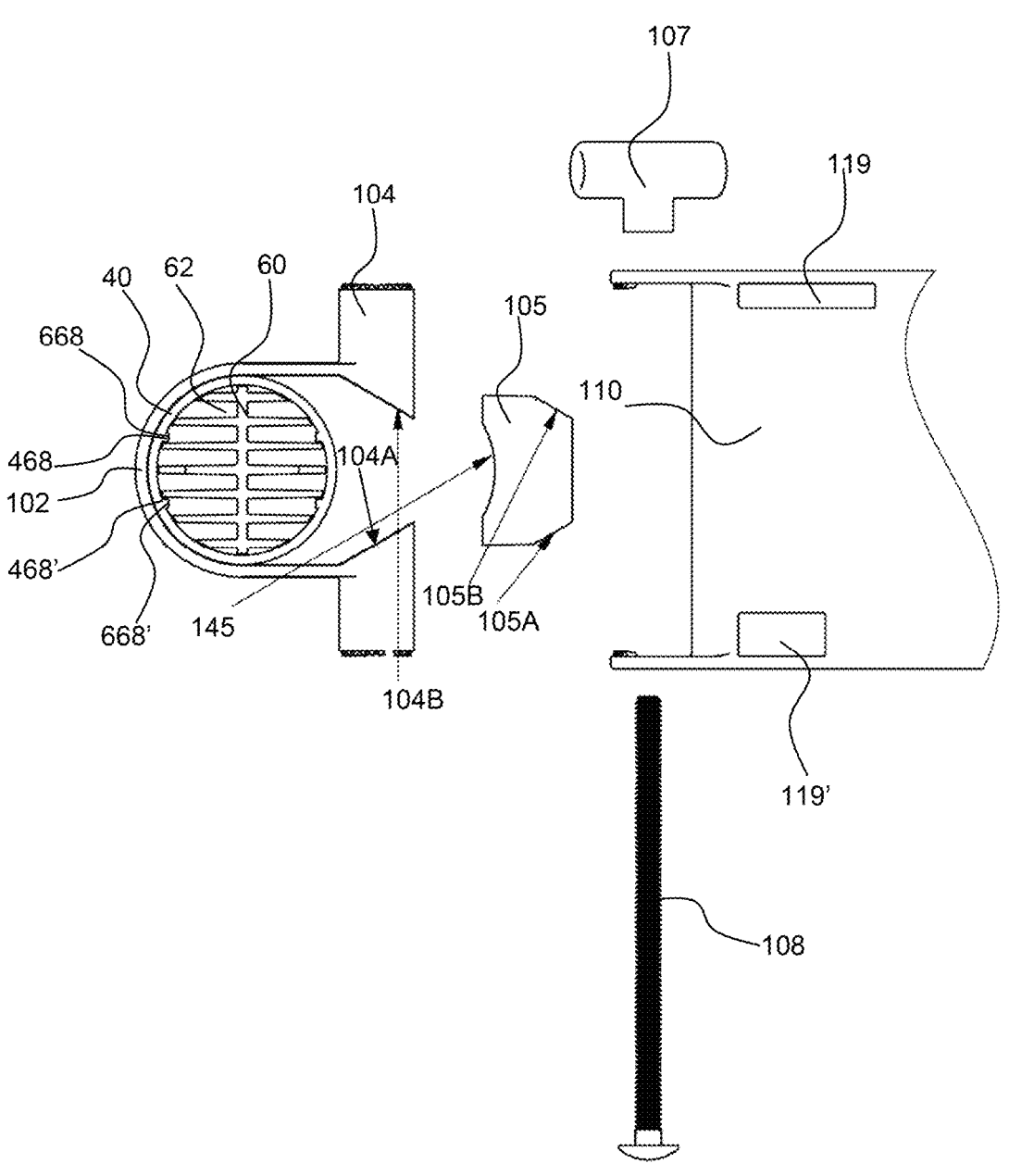
FIG. 12 shows top exploded view of a portion of the cutting board and bait holder assembly and the rod spike assembly.

As shown in FIG. 4, the spike 60 extends a spike length along a length axis 65 from spike coupled end 61 to spike end 64 having spike ribs 67 that extend along the length of the spike and a spike tapered portion 69 for insertion into the sand. Spike tapered end indentations 694 make it easier for someone to manually grab and pull the spike out from the sleeve tube 48 of the rod sleeve 40. The spike 60 has a spike coupler portion 610 on the spike coupled end 61 that includes the spike retainer and spike indentations 668 and spike coupler apertures 62 as shown in FIG. 12 that enable water and sand to pass through the spike coupler portion. The spike indentations are configured to couple with the sleeve tube ribs 468, 468' (FIG. 12) to keep the spike aligned during movement within the sleeve tube 48. Also, the spike coupler portion of the spike has a spike retainer 622, such as a spike-ball 624 that is coupled to a spike-retainer spring 626 that forces the spike retainer outward from the spike. This spike-ball 624 is aligned with the sleeve-spike insert end retainer aperture 43 and the sleeve-spike end retainer aperture 46 of the rod sleeve 40 and enables the spike to be retained in a stowed configuration with the spike-ball retained by the sleeve-spike insert end retainer aperture 43 and then, upon releasing the spike-ball by pressing inward, slide down to the sleeve-spike end retainer aperture 46 to configured the spike in an extended configuration. The force of the spike-retainer spring 626 can be overcome by pressing inward on the spike retainer through the respective apertures in the rod sleeve 40.

An insertion step 80 is coupled to the spike 60 and is configured to pivot about a step pivot 86 from a stowed configuration as shown in FIG. 2, wherein the insertion step is pivoted up against the spike 60 and into step recess 68 of the spike extension 66 to allow clearance for the spike to slide within the sleeve tube 48 of the rod sleeve 40, to a insert configuration with the insertion step pivoted out from the spike sleeve as shown in FIG. 3. In insertion step has a length along a length axis 83 from a step coupled end 82 to a step extended end 84 and has a step pivot aperture 87 that enables a pivotable connection to the spike 60 via the pivot retainer 88, such as a step pivot retainer pin.

A strap 30 is detachably attachable to the rod sleeve 40 via the strap insert end coupler 32 and the strap spike end coupler 34 that are attachable to the respective insertion collar strap retainer 432 and spike collar strap retainer 434. The insertion collar strap retainer 432 and spike collar strap retainer 434 are configured on the respective insertion end collar 41 and spike end collar 45. The spike end collar 45 has a spike end collar aperture 456 that aligns with the sleeve-spike end retainer aperture 46 to receive the spike retainer 622, the spike-ball 624 therethrough.

With reference to FIG. 12, the rod sleeve 40 has sleeve tube ribs, 468, 468' that correspond with spike indentations 668, 668' to prevent the spike from rotating as the spike is extended from the stowed position to an extended position such that the spike retainer 622 is in alignment with the sleeve-spike insert-end retainer aperture 43 in the stowed configuration and the sleeve-spike end retainer aperture 46 when in an extended configuration. Note that the tube ribs and/or the spike indentations may extend between the sleeve-spike insert end retainer aperture 43 and the sleeve-spike end retainer aperture 46 and the other may extend only a portion of the length between these two apertures, thereby reducing friction.

Figure 5:
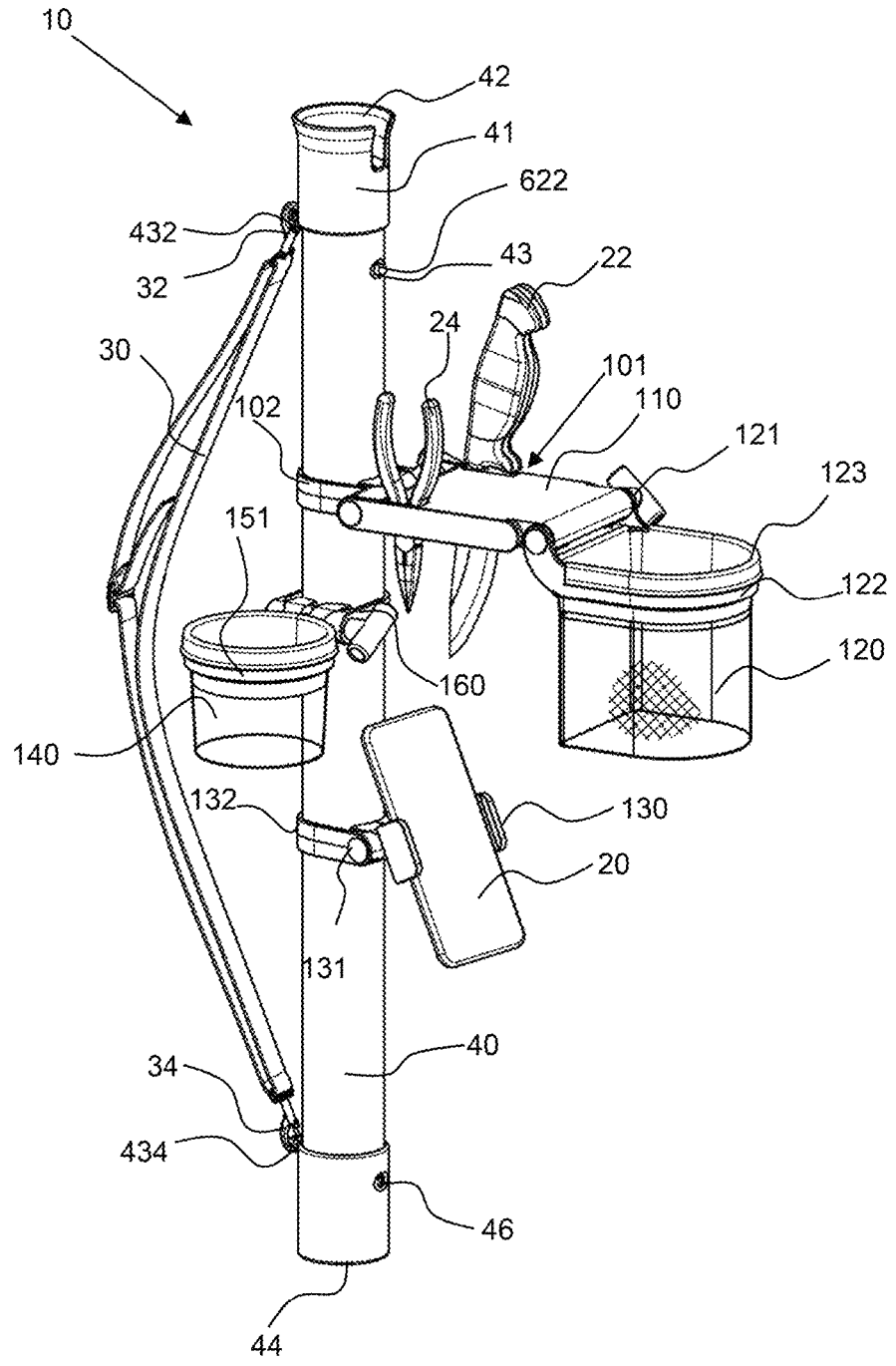
FIG. 5 shows a side view of a surf fishing rod holder system with the spike stowed within the rod sleeve and with a cutting board, bait holder, beverage holder and mobile device holder attached to the rod sleeve.
Figure 6:
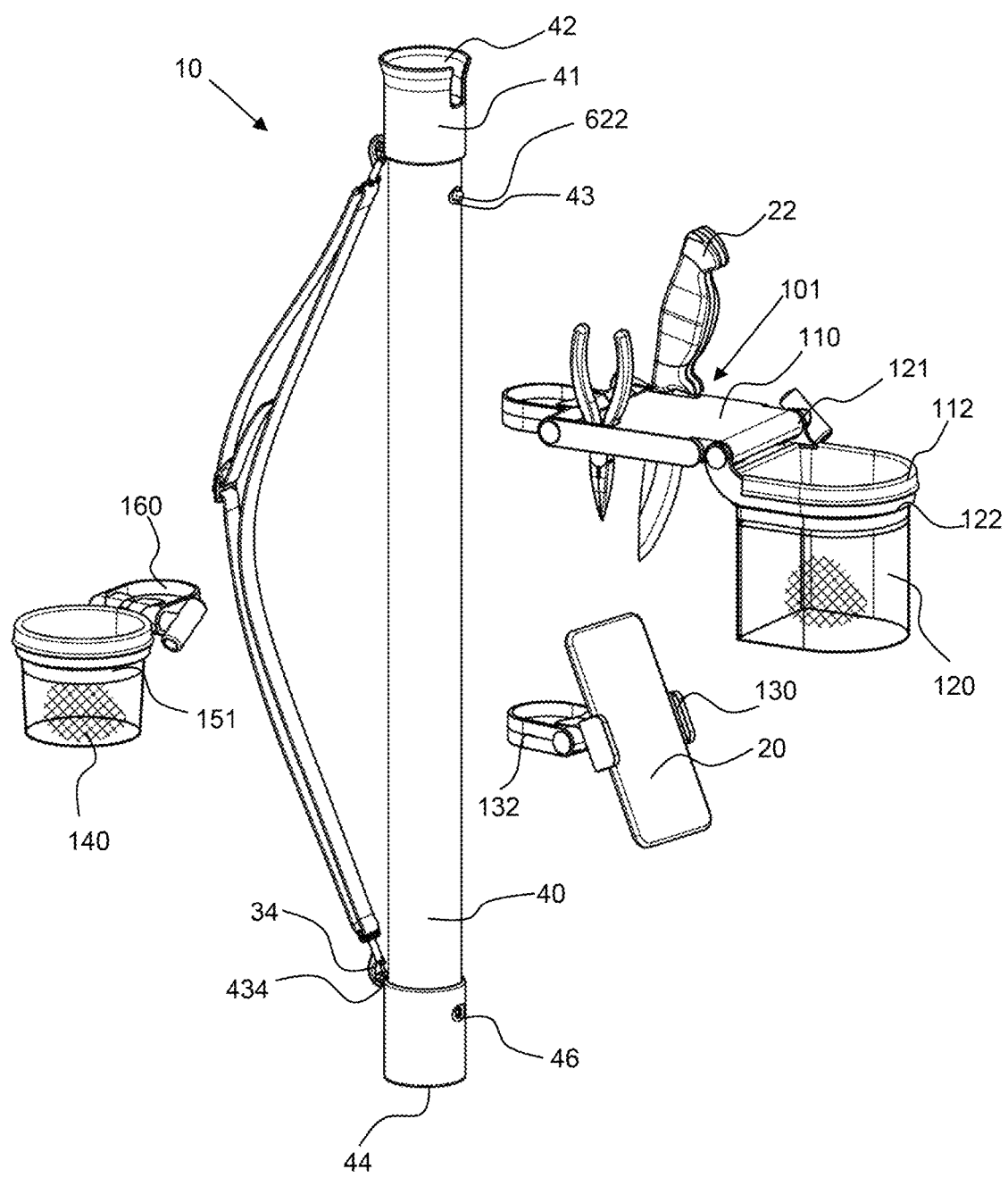
FIG. 6 shows a side view of a surf fishing rod holder system shown in FIG. 5, with the cutting board, bait holder, beverage holder and mobile device holder detached from the rod sleeve.
Figures 7, 8, 9:
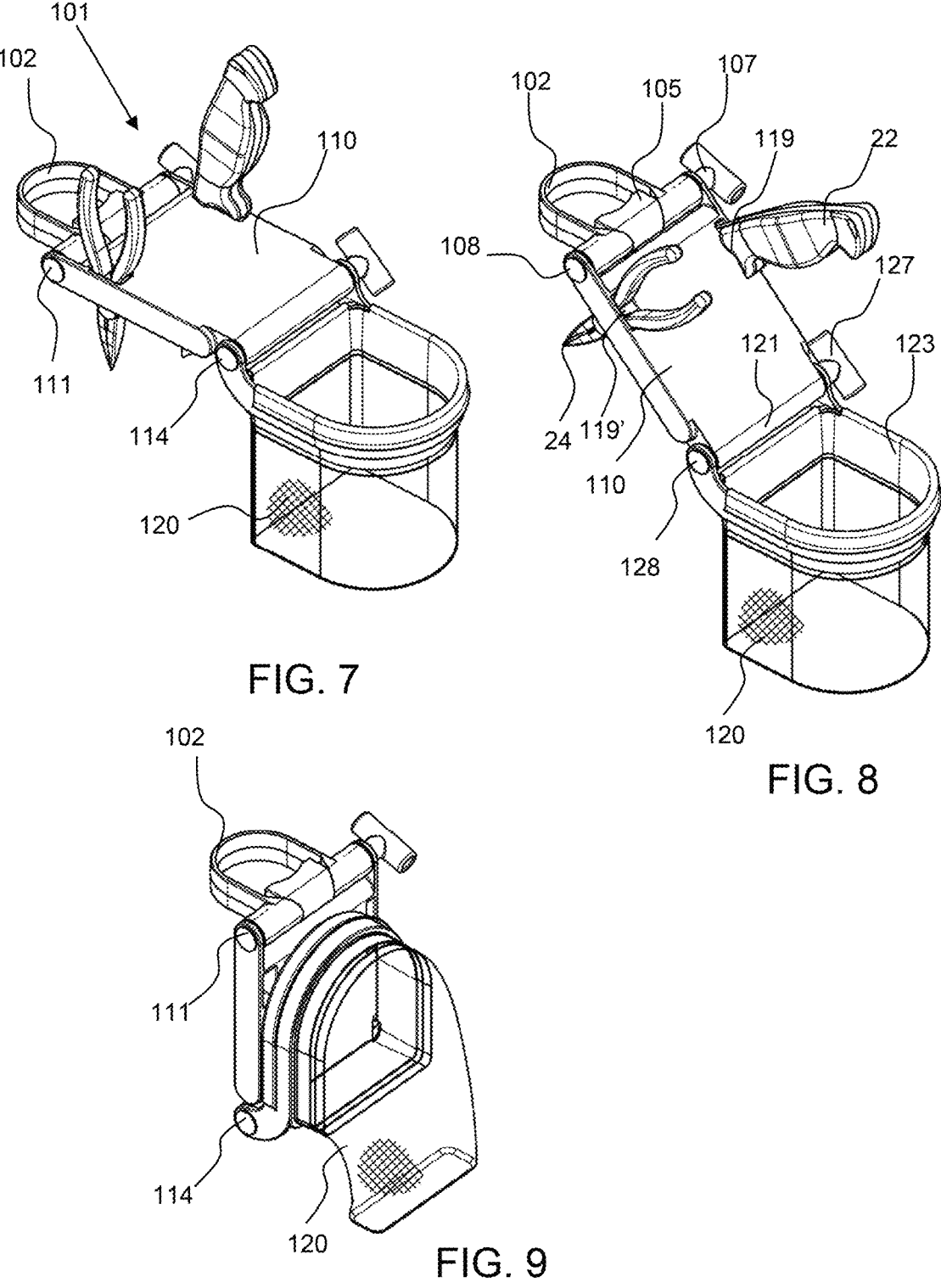
FIG. 7 shows a perspective view of the cutting board and bait holder assembly in a first position.
FIG. 8 shows a perspective view of the cutting board and bait holder assembly shown in FIG. 7 now in a second position.
FIG. 9 shows a perspective view of the cutting board and bait holder assembly shown in FIG. 7 now in a third position.

Referring now to FIGS. 5 and 6, the surf fishing rod holder system 10 includes a cutting board 110, bait holder 120, beverage holder 140 and mobile device holder 130 that are attached in FIG. 5 and shown detached in FIG. 6. Each of these components of the surf fishing rod holder system 10 are detachably attachable to the rod sleeve 40 via attachment rings that extend around the rod sleeve and can be tightened around the rod sleeve to prevent the component from sliding along the rod sleeve. The cutting board and bait holder assembly 101 includes the cutting board attachment ring 102 that extends around the rod sleeve 40 and secures the cutting board to the rod sleeve and a bait enclosure ring 123 that is coupled to the cutting board by the bait enclosure retainer assembly 121. The beverage holder 140 is retained by the beverage holder ring 151 that is coupled to the beverage holder sleeve ring 160 that extends around the rod sleeve 40. Likewise, the mobile device 20, such as a mobile phone, is retained to the rod sleeve by the mobile device holder 130 including a mobile device ring 132 that extends around the rod sleeve and forms a mobile device pivot 131 such that the mobile device holder 130 can pivot with respect to the mobile device ring 132. As shown in FIG. 5, both the knife 22 and a tool 24 are retained in the cutting board tool apertures.

Figures 10, 11:
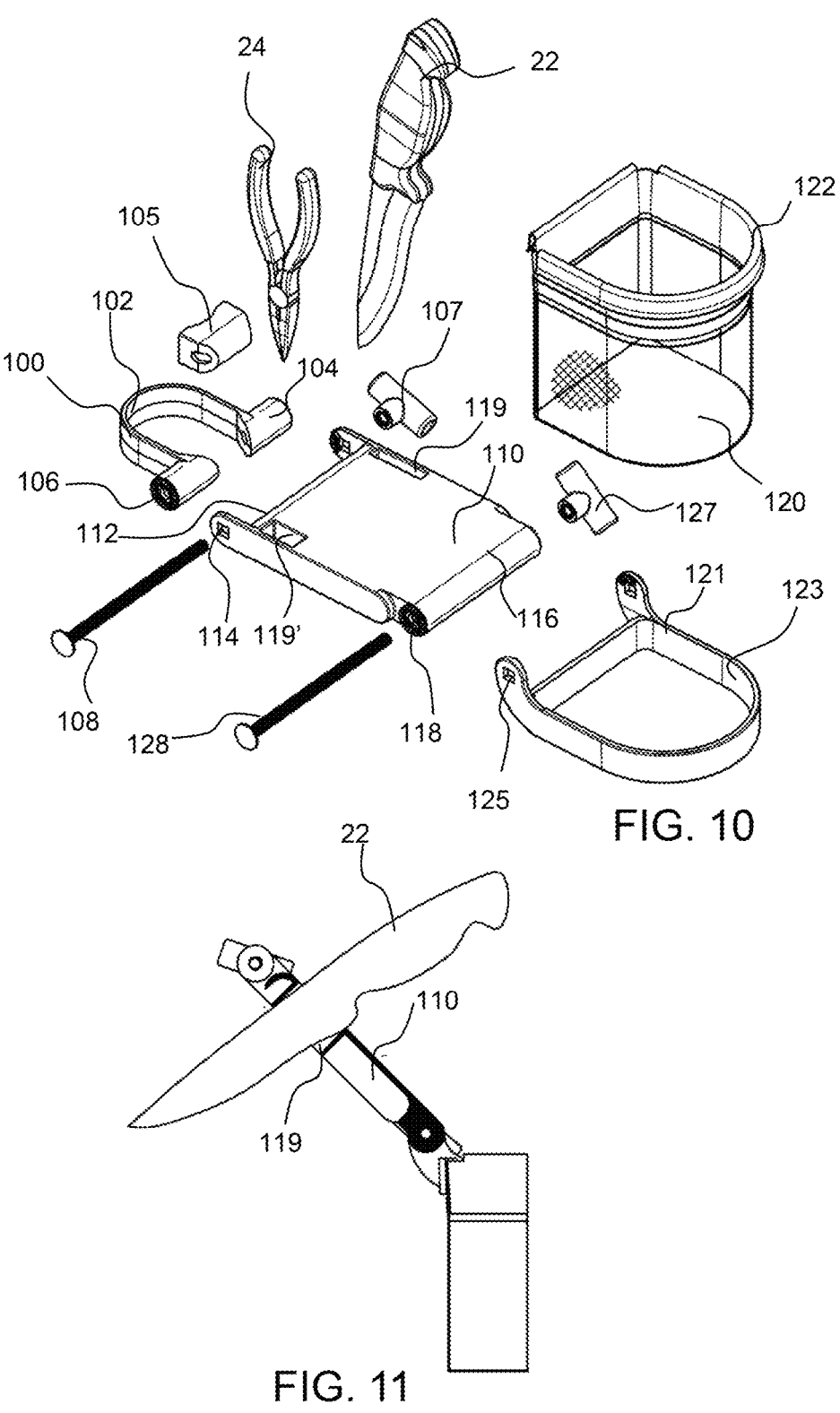
FIG. 10 shows an exploded view of the cutting board and bait holder assembly.
FIG. 11 shows a cross-sectional view of the cutting board and knife retained within the cutting board tool aperture.

Referring now to FIGS. 7 to 12, the cutting board and bait holder assembly 101 includes a cutting board 110 pivotably coupled to the rod sleeve and a bait holder 120 pivotably coupled to the cutting board. As best shown in the exploded view, FIG. 10, the cutting board attachment 100 includes a cutting board attachment ring 102 that is configured to extend around the rod sleeve and tighten around the rod sleeve via the cutting board attachment ring fastener 108 that extends through the cutting board attachment ring sleeve aperture 106 of the cutting board attachment ring sleeves 104, the cutting board coupled end fastener aperture 114 and the attachment ring wedge 105 that is pressed against the rod sleeve as the cutting board attachment ring fastener 108 is tightened by the cutting board attachment ring fastener retainer 107. This produces a cutting board sleeve pivot 111 with the rod sleeve to enable the cutting board to pivot with respect to the rod sleeve and the be tightened by the cutting board attachment ring fastener retainer 107 to secure the cutting board in a pivoted position. The cutting board extends from the cutting board coupled end 112 to the cutting board extended end 116 as shown in FIG. 10.

As shown in FIG. 12, the attachment ring wedge 105 has surfaces that are configured to slide along mating surface to force the attachment ring wedge against the rod sleeve 40 as the cutting board attachment ring fastener 108 is tightened through the cutting board attachment ring sleeve 104. The attachment ring wedge 105 has wedge-sleeve surfaces 105A and 105B that slide along the sleeve-wedge surfaces 104A, 104B, respectively. Also, the wedge has a wedge-rod surface 145 that is curved to match the curvature of the rod sleeve to enable a secure retainment of the cutting board and bait holder assembly 101 to the rod sleeve.

The bait holder 120 is coupled to the cutting board extended end 116 by the bait enclosure retainer assembly 121 including a bait enclosure ring 123 that is secured to the cutting board by the bait enclosure fastener 128 that extends through the cutting board extended end aperture 118 the bait enclosure ring fastener aperture 125 and is tightened by the bait enclosure fastener retainer 127. The bait holder 120 has a bait enclosure flange 122 that is configured to rest on the bait enclosure ring 123 and the bait holder 120 may be a rigid material or may be flexible, such as a netting material that is supple.

As shown in FIG. 11, the knife 22 is retained in the cutting board tool aperture 119 of the cutting board 110. As shown in FIG. 10, the cutting board 110 has two cutting board tool apertures 119, 119'.

As shown in FIGS. 13 to 17, a beverage holder 140 is secured to the rod sleeve by a beverage holder retainer assembly 150 that includes a beverage holder sleeve ring 160 configured to extend around the rod sleeve and tighten thereto via the beverage holder fastener 153 that extends through the beverage holder sleeve ring aperture 161, through the beverage holder wedges 162, 162' and the beverage holder ring loop 152 and is tightened by the beverage holder fastener retainer 154 to form the beverage holder pivot 156. The beverage holder ring loop 152 is attached to the beverage holder ring 151 and the beverage holder 140 has a beverage holder flange 142 configured around the top of the beverage holder receptacle 141. As shown in FIG. 15, the beverage holder 140 is pivoted up and in FIG. 14, the beverage holder is pivoted down with respect to the beverage holder sleeve ring 160. The beverage holder receptacle 141 is a flexible fabric, such as a mesh or netting material. As shown in FIGS. 16 and 17, the beverage holder wedges 162, 162' have wedge stops 165, 165' respectively configured around the beverage holder wedge apertures 163, 163' that prevent the wedges from rotating as they engage with the beverage holder ring loop 152.

Those skilled in the art that various modifications, combinations and variations can be made in the present invention without departing from the scope of the invention. Specific embodiments, features and elements described herein may be modified, and/or combined in any suitable manner. Thus, it is intended that the present invention covers the modifications, combinations and variations of this invention provided they come within the scope of the appended claims and their equivalents.

What is claimed is:

1. A surf fishing rod holder system comprising:
   a) a rod sleeve extending from an insertion end to a spike end and comprising:
      i) a sleeve tube extending from the insertion end to the spike end;
      ii) a sleeve-spike insert-end retainer aperture;
      iii) a sleeve-spike end retainer aperture;
      iv) a sleeve tube rib extending from the interior of the sleeve tube;
   b) a spike slidably engaged within the sleeve tube and extending from a spike coupled end to a spike end and comprising:
      i) a spike retainer;
      wherein the spike retainer is a spike ball; and
      ii) a spike retainer spring that forces the spike retainer away from the spike;
      iii) a spike coupler portion configured on the spike coupled end; and
      iv) a spike extension that extends from the spike coupler portion to the spike end;

v) a plurality of spike ribs that extend along the spike extension;

vi) a spike indentation in the spike coupler portion;

vii) a spike tapered portion that tapers toward the spike end of the spike;

wherein the spike retainer is configured on the spike coupler portion;

wherein the spike is configured to slide within the sleeve tube from a stowed configuration with the spike retainer extending through into the sleeve-spike insert-end retainer aperture, to an extended configuration with the spike retainer extending into the sleeve-spike insert-end retainer aperture; and wherein the spike indentation extends around the sleeve tube rib to guide the spike as it moves from the stowed configuration to an extended configuration to align the spike ball with the sleeve-spike insert-end retainer aperture in said stowed configuration and with the sleeve-spike end retainer aperture in the extended configuration;

c) an insertion step comprising a step pivot, wherein the insertion step is pivotably coupled to the spike by said step pivot and configured to pivot from a stowed configuration wherein the inserting step extends along the spike to a step configuration wherein the insertion step is pivoted away from the spike, and wherein the spike comprises a step recess for receiving the insertion step when in a stowed configuration to allow the spike with the insertion step to slide into the sleeve tube of the rod sleeve.

2. The surf fishing rod holder system of claim 1, wherein the spike further comprises a spike tapered end indentation on the spike end.

3. The surf fishing rod holder system of claim 1, wherein the spike coupler portion comprises spike coupler apertures configured to allow water and sand to pass through the spike coupler portion.

4. The surf fishing rod holder system of claim 1, further comprising a cutting board and bait holder assembly comprising:

a) a cutting board attachment;

b) a cutting board detachably attached to the rod sleeve by said cutting board attachment;

c) a bait enclosure retainer assembly; and d) a bait holder coupled to the cutting board by said bait enclosure retainer assembly.

5. The surf fishing rod holder system of claim 4, wherein the cutting board further comprises a cutting board tool aperture configured to receive a tool therein.

6. The surf fishing rod holder system of claim 4, wherein the cutting board attachment comprises:

a) a cutting board attachment ring that extends around the rod sleeve, b) a cutting board attachment ring fastener; and c) a cutting board attachment ring fastener retainer that couples with the cutting board attachment ring fastener to tighten the cutting board attachment ring to the rod sleeve.

7. The surf fishing rod holder system of claim 6, wherein the cutting board attachment further comprises an attachment ring wedge that has a cutting board attachment ring sleeve aperture for receiving the cutting board attachment ring fastener therethrough, and wherein the attachment ring wedge is forced toward the rod sleeve when the cutting board attachment ring fastener is tightened.

8. The surf fishing rod holder system of claim 6, wherein the bait enclosure retainer assembly further comprises a bait enclosure fastener and bait enclosure fastener retainer that receives the bait enclosure fastener to tighten the bait enclosure fastener to secure the bait enclosure ring to the cutting board.

9. The surf fishing rod holder system of claim 4, wherein the bait holder comprises a bait enclosure flange and wherein the bait enclosure retainer assembly comprises a bait enclosure ring;

wherein the bait enclosure flange is retained on the bait enclosure ring; and wherein the bait holder is detachably attached to the bait enclosure retainer assembly.

10. The surf fishing rod holder system of claim 4, wherein the bait holder comprises netting.

11. The surf fishing rod holder system of claim 1, further comprising a beverage holder assembly that is detachably attachable to the rod sleeve, comprising:

a) a beverage holder comprising:

i) a beverage holder receptacle;

ii) a beverage holder ring loop;

b) a beverage holder retainer assembly comprising:

i) a beverage holder sleeve ring having beverage holder sleeve ring apertures on opposing sides of said beverage holder sleeve ring;

wherein the beverage holder sleeve ring is configured to extend around the rod sleeve;

ii) a beverage holder wedge having a beverage holder wedge aperture;

wherein the beverage holder wedge is configured between said opposing sides of said beverage holder sleeve ring;

iii) a beverage holder fastener;

wherein the beverage holder fastener is configured to extend through the beverage holder sleeve ring apertures and through the beverage holder wedge aperture and also through the beverage holder ring loop to secure the beverage holder ring loop to the beverage holder retainer assembly.

12. The surf fishing rod holder system of claim 11, wherein the beverage holder receptacle is a flexible fabric.

13. The surf fishing rod holder system of claim 11, wherein the beverage holder ring loop is coupled to a beverage holder ring and wherein the beverage holder receptacle is configured to be supported by the beverage holder ring.

14. The surf fishing rod holder system of claim 11, wherein the beverage holder retainer assembly comprises two beverage holder wedges and wherein the beverage holder ring loop is configured between the two beverage holder wedges and is configured to be pinched by said two beverage holder wedges when the beverage holder fastener is tightened between the opposing sides of said beverage holder sleeve ring.

15. The surf fishing rod holder system of claim 1, further comprising a mobile device holder that is detachably attachable to the rod sleeve.

* * * * *